Dec. 1, 1931.    S. BLOOMENTHAL ET AL    1,834,044

LIGHT VALVE

Filed Dec. 30, 1929

INVENTORS
SIDNEY BLOOMENTHAL
AND BENJAMIN ADLER
BY
ATTORNEY

Patented Dec. 1, 1931

1,834,044

UNITED STATES PATENT OFFICE

SIDNEY BLOOMENTHAL, OF NEW YORK, AND BENJAMIN ADLER, OF WHITESTONE, NEW YORK, ASSIGNORS TO RADIO CORPORATION OF AMERICA, A CORPORATION OF DELAWARE

LIGHT VALVE

Application filed December 30, 1929. Serial No. 417,345.

The present invention relates to Kerr cells and particularly to a method and means for obtaining a higher Kerr constant for the solution employed as the double refracting medium.

It has been found from considerable experimentation that it is possible to decrease the bias voltage necessary for operating Kerr cells efficiently when the temperature of operation is lowered, and, therefore, we have sought to provide a method and means by which the Kerr cell used with our invention may be at all times cooled to a considerable degree so that the Kerr constant may be increased to a material extent.

As a further object of our invention, we have sought to develop a method and means by which the optically active solution contained within the Kerr cell may be rendered more efficient for use in connection with cells of this type or of similar types by cooling the liquid during the time when electric potentials are applied thereto.

Other objects of our invention are to produce in a manner to be hereinafter set forth, a device for optically controlling light in accordance with applied electric potentials, which is efficient in its use, conveniently operated, readily set up, simple in its construction and cheap to install.

Figure 1:
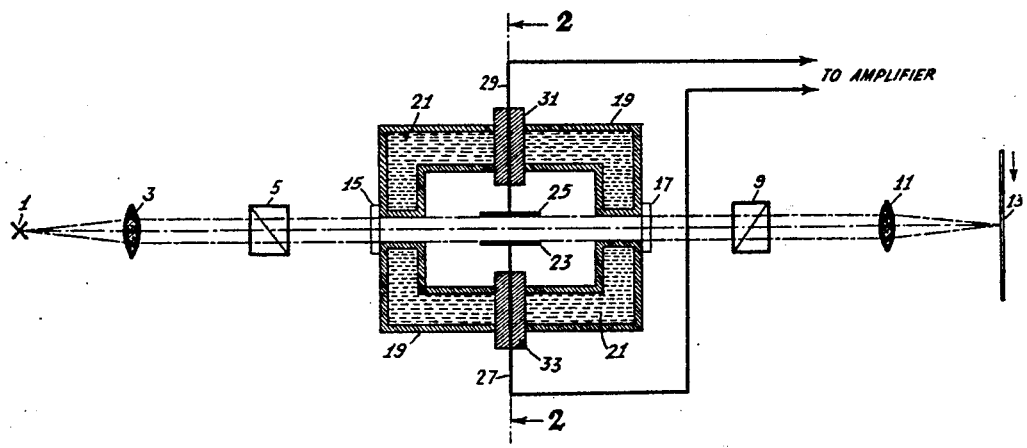
Figure 2:
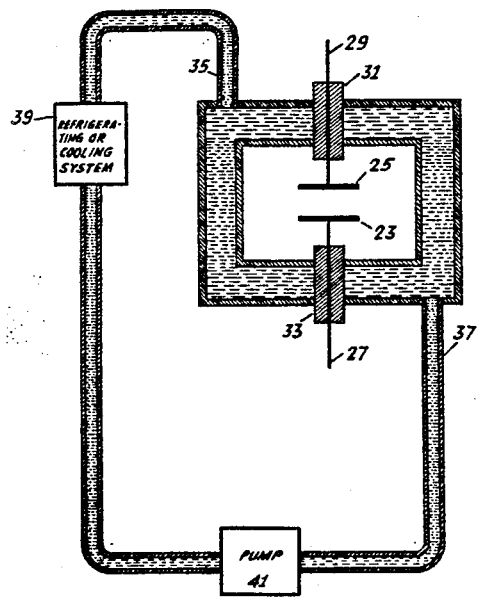

Still other and further objects will become apparent and at once suggest themselves to those skilled in the art to which the invention relates by reading the following specification and claims in connection with the accompanying drawings: wherein, Fig. 1 diagrammatically and conventionally illustrates a section through a Kerr cell and its associated optical system provided with a cooling system, in accordance with our invention; and, Fig. 2 illustrates a sectional view of the arrangement taken on the line 2—2 of Fig. 1, and, in addition, shows a suitable form of circulating system for supplying cooling liquid to the cell at all times.

It has heretofore been known in the art that light may be controlled through the use of electrostatic fields or the like by resorting to the Kerr phenomena in accordance with the teachings of Karolus and others, and to diagrammatically illustrate this arrangement, light produced at a source 1 may be directed through a lens system 3 through a polarizer 5 so as to pass through the Kerr cell conventionally shown as 7, and then, after being electrically doubly refracted in accordance with potentials applied to the cell, passed on through the analyzer 9 and a lens system 11 so as to direct the light on to a recording strip 13. Of course, it is conceivable that the recording strip 13 may be replaced by a photoelectric element, or the like, where it is desired to utilize the Kerr cell and its associated optical system for converting electrical potentials into proportionate changes in light intensity and then reconverting the controlled light into electrical potentials so as to actuate an audible recorder or sound reproducer rather than a light sensitive recorder, as shown. The invention also has application to television systems wherein the eye itself serves as a recorder for the produced images by viewing the Kerr cell directly. These embodiments, of course, naturally follow from our invention, and, therefore, the invention is to be broadly construed and not limited to the particular embodiments shown.

In accordance with the present disclosure, we have arranged the cell 7 so that it is provided with a water jacket surrounding the same. Light from the polarizer 5 may be passed through the window 15 of the cell between the electrodes 23 and 25 and leave the cell through the window 17 so as to pass through the analyzer 9 in the manner above described. While the invention has been illustrated in its conventional embodiment as being applied to a Kerr cell of the two-electrode type, it is, of course, recognizable that the cell may be of the multiple-electrode type, as has been previously disclosed by Karolus. In accordance with the teachings of Karolus, electric potentials may be applied from an amplifier (not shown) to conductors 29 and 27 passing through insulating plugs 31 and 33 mounted in the chamber 19, to be hereinafter described in connection with the cooling system. Electric potentials applied to the conductors 29 and 27 respectively are then impressed upon the electrodes 25 and 23 of the cell so as to control the light beams passing therethrough.

Surrounding the Kerr cell and also the optical system therefor, where desired, (although not shown for convenience of illustration), we have provided a chamber 19 to which a cooling liquid may be applied through inlet pipe 35 so as to flow in the space 21 so as to maintain the cell including the liquid contained therein within the central portion of the chamber and between the electrode members 23 and 25 cooled at all times.

The liquid contained between the electrodes 23 and 25 within the chamber 19 is preferably, in accordance with the present developments of the Kerr cell and the like, nitrobenzene, which has a freezing point of practically 5.4° centigrade, but it should be understood that other solutions may be substituted where desired. For example, it has already been suggested that carbondisulphide may be used for the purpose of realizing the Kerr effect. Also, other liquids such as, for example, aniline, toluol, xylol, cumol, chloroform, methylalcohol, amylchloride, iodo-benzol and other similar substances, may be used and still produce the Kerr effect to a greater or lesser extent. For operating cells in accordance with our disclosure, it has been found that the maintaining of the liquid (whatever liquid be chosen) at a temperature just above the freezing point, for example just above 5.4° centigrade, assuming nitrobenzene has been used, will increase the Kerr constant to a considerable extent. Where nitrobenzene is used, it is, of course, possible to maintain the circulation of cold water, for example, within the circulatory system including the intake tube 35, the space 21 within the chamber 19, the out-take pipe 37, pump 41 and the refrigerating or cooling system 39 so that liquid is circulating at all times.

However, it is also observed that other liquids which are optically responsive upon the application of an electric field may have lower freezing points than nitrobenzene, and, therefore, occasions arise where cold water circulating through the closed circulatory cooling system is not sufficient to maintain the solution between the electrodes sufficiently cool to maintain a high Kerr constant therein. Therefore, under such conditions, it is advisable to substitute for the water in the cooling system other liquids having a lower freezing point than water, and to substitute for the cooling system 39 a refrigerating system 39 so as to bring the temperature down considerably below the freezing point of water in order to increase the Kerr constant. It was heretofore thought suffiicent in practice to maintain the temperature of the Kerr cell as a unit at approximately room temperature in order to obtain satisfactory operation, but it has been observed that such temperature is not sufficient to prevent decomposition of the liquid by heat or boiling away of the liquid when subjected to electrostatic fields so as to produce electric double refraction of a light beam passing therethrough and control the same in accordance with applied signal intensities. In addition, cooling diminishes molecular motions of the medium, such as nitrobenzene, and enables these electrical dipoles to maintain their orientation in the electric field. According to the teachings of Debye (see, for example, Marx, "Handbuch der Radiologie", Vol. VI, 1924, page #754), this orientation is mainly responsible for double refraction exhibited by polar molecules placed in a strong electric field. Therefore, recourse is had to an artificial cooling system whereby a high value of the Kerr constant is assured irrespective of what liquid may be used in the cell.

In accordance with the above disclosure, various modifications and changes may suggest themselves to those skilled in the art, and we, therefore, believe our invention should be interpreted in accordance with the spirit and scope of the hereinafter appended claims as applied to the system in general and not limited by the terminology therein used.

Having now described our invention, what we claim and desire to secure by Letters Patent is the following:

1. A method for controlling polarized beams of light by electrical voltage impulses by means of a Kerr cell which consists in directing the light beam between the electrodes of the cell, in supplying voltage impulses to the cell electrodes, and in maintaining the liquid contained within the cell at a temperature near its freezing point for increasing the value of the Kerr constant thereof.

2. In a system for electrically controlling light beams, a Kerr cell having polarized light passing therethrough and a liquid contained within said cell, means for applying potentials to the electrodes of said cell for rendering said liquid doubly refractive and thereby controlling the intensity of the light beams passing therethrough, and a cooling system for maintaining the liquid contained within said cell at a temperature slightly above the freezing temperature thereof for increasing the Kerr constant thereof.

3. In a light control system, a light valve having an optically responsive liquid contained therein adapted to control polarized light passing therethrough in accordance with varying electric impulses applied thereto, and means for maintaining the liquid contained within said cell at a temperature close to the freezing point for increasing the optical constant thereof.

4. In a light control system, an electrostatic light valve having an optically responsive liquid contained therein and polarized light beams passing therethrough, means for applying electric potentials to the electrodes of said cell for electrically doubly refracting said polarized light beams and thereby causing light of an intensity proportional to the electric potentials applied to be emitted from said cell, a refrigerating system for cooling the optically responsive liquid contained within said cell to a point near the freezing point thereof to increase the Kerr constant thereof, and means for circulating and cooling said liquid during its passage through said cell.

5. A method for controlling polarized beams of light by electrical voltage impulses by means of a Kerr cell which consists in directing the light beam between the electrodes of the cell, in supplying voltage impulses to the cell electrodes, and in maintaining the liquid contained within the cell at a temperature slightly above and near its freezing point for increasing the value of the Kerr constant thereof.

SIDNEY BLOOMENTHAL.
BENJAMIN ADLER.